Sept. 15, 1970     C. A. LEE ET AL     3,528,227
PROTECTIVE ANIMAL CAGE COVER
Filed Oct. 11, 1968     3 Sheets-Sheet 1

INVENTORS
CHARLES A. LEE
FRANK D. SORRELLS

ATTYS.

Sept. 15, 1970      C. A. LEE ET AL      3,528,227

PROTECTIVE ANIMAL CAGE COVER

Filed Oct. 11, 1968      3 Sheets-Sheet 2

INVENTORS
CHARLES A. LEE
FRANK D. SORRELLS

Anderson, Luedeka, Fitch, Even, & Tabin
ATTYS.

Sept. 15, 1970     C. A. LEE ET AL     3,528,227
PROTECTIVE ANIMAL CAGE COVER
Filed Oct. 11, 1968     3 Sheets-Sheet 3

INVENTORS
CHARLES A. LEE
FRANK D. SORRELLS

ATTYS.

United States Patent Office 3,528,227
Patented Sept. 15, 1970

3,528,227
PROTECTIVE ANIMAL CAGE COVER
Charles A. Lee and Frank D. Sorrells, Knoxville, Tenn., assignors, by mesne assignments, to Appleton Wire Works Corporation, Appleton, Wis., a corporation of Wisconsin
Filed Oct. 11, 1968, Ser. No. 766,755
Int. Cl. A01k 1/00; B01d 39/00, 39/14
U.S. Cl. 55—524
6 Claims

ABSTRACT OF THE DISCLOSURE

A protective cover for an animal cage is formed from a fibrous web material and is made to withstand autoclaving. The cover may be made by thermoforming the fibrous web into a shape to fit over and seal with the animal cage.

---

This invention relates in general to a cover for protecting animals in animal cages against diseases carried by air-borne contaminants and to the method of making the protective cover. The invention relates more specifically to molded cover of the class described and to such a cover which is capable of withstanding temperature in the range of those employed in autoclaves so that the covers can be sterilized by heat for reuse.

Present day large scale experimental research requires large colonies of animals such as mice, rats or the like to be born, raised and housed in cages within enclosed buildings. To efficiently house such large numbers of animals, they are usually housed in animal cages which are conveniently stacked in tiers and rows. This close proximity of animals renders them particularly susceptible to infectious diseases, which may wipe out colonies of such animals and cause the loss of very expensive and valuable research.

Mice and other animals may be very active and, as they walk and scratch and move about in their cages, bits of food, hair and other refuse may be knocked from their particular cage into another cage or workspace and contaminate other animals. Also, such animal activity may result in small particles of dust, excrement or other material containing viruses or bacteria becoming air-borne and transported by air currents to cause infection of the colonies.

Attempts have been made to contain air-borne contaminants in the cages as well as to prevent the entry of contaminants from the ambient atmosphere ino the cage. For instance, fiber glass mats have been secured to the tops of the cages in an attempt to filter dust and other particles from the air and this procedure has resulted in some success in filtering the larger sized particles from the air. However, air-borne virus, bacteria and other small particles passed through the fiber glass mat and infected animals in the cages. Moreover, such fiber glass covers were uncomfortable to handle because of the tendency of such fibers to become embedded in the hands of the persons handling the covers. Also, the covers were not sufficiently rugged to withstand the repeated handling which is required in use.

In an attempt to filter very small particles and viruses from air entering cages, covers have been made with extremely fine pores or openings between micro-fine fibers to prevent movement of viruses and the like through the filter medium specifically, U.S. Pat. No. 3,343,520 discloses a filter cover for the purpose of filtering viruses, bacteria and very small particles from air entering the cages. However, covers of this type are not rugged and are not adapted to repeated use as well as haivng other disadvantages.

In short, there is a definite need for a cover to protect animals within cages against air-borne contaminants including viruses, bacteria and other very minute particles transporting the same. While the cover construction must effectively prevent the passage of disease bearing contaminants, it must be sufficiently permeable to air to provide the necessary oxygen level and at the same time to permit the dissipation of heat, humidity and carbon dioxide. The cover should also be sufficiently rugged to withstand repetitive handling and should be relatively non-irritating to the skin of persons handling the cover.

After a protective cover has been used for a period of time, it is removed and sterilized to kill any possible contaminants trapped in or on the cover. While protective covers may be sterilized with conventional gas sterilization techniques such as those employing ethylene oxide, it is often desired that the protective cover be capable of withstanding a steam autoclaving. Typically, a steam autoclaving suitable for sterilizing such covers uses a steam at about 250° F. and at pressures ranging up to 20 p.s.i. As will be pointed out, the preferred form of the protective cover of this invention is made with synthetic resin filaments or fibers, such as polyester fibers and thermoplastic particles, such as polyethylene; and at these autoclaving temperatures, the dimensions of he fibers or filaments change and the thermoplastic particles soften. As a result, the protective covers which were self-sustaining at ordinary room temperatures become nonselfsustaining and experience shrinkage and may even deform and collapse. Moreover, after autoclaving, the permeability changed and the protective covers were no longer capable of sealing tightly with the cage to prevent the leaking of air-borne contaminants into the cage.

The problem of maintaining dimensional stability for the protective cover is particularly difficult when the shaped covers are formed from flat sheets of material by stretching and molding the fibrous web at elevated temperatures. After experiencing such stretching during molding, the cover material is particularly susceptible because of the "memory" of the fibers, to deformation and collapsing at the elevated temperatures encountered in autoclaving. Complicating the problem of stabilizing such protective covers is the requirement that the narrow tortuous passageways between the fibers remain open and unclogged so that proper ventilation and protection against contamination be maintained.

The principal object of the invention is to provide an improved cover of the class described. Another object of the invention is to provide protective covers of the type described which may be sterilized by autoclaving and then reused as a protective cover.

Other objects and advantages of the invention will become apparent from the detailed description taken in connection with the accompanying drawings in which.

As shown in the drawings (FIGS. 1 and 2) for purposes of illustration, a protective cover 11 embodying various features of the invention is seated on and covers the open top of a cage 12 which includes a lower housing or pan 13 in the interior of which the laboratory animals are confined. The cage also includes a grade 14 formed of cross strips of metal or plastic across the top of the pan 13 to prevent escape of the animals from the pan.

Figures 1, 2, 3:
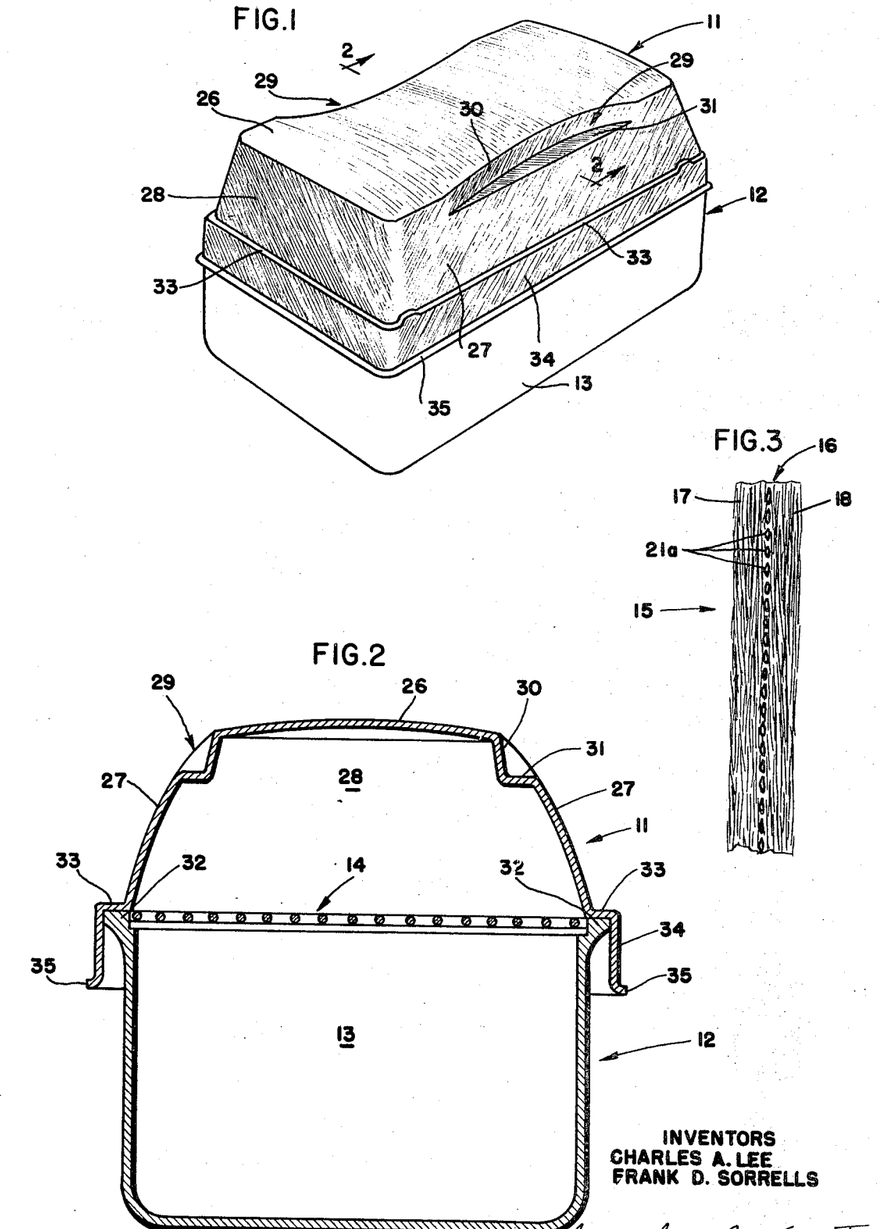
FIG. 1 is a perspective view of an animal cage having a protective cover embodying various of the features of the invention.
FIG. 2 is an enlarged sectional view taken substantially along the line 2—2 of FIG. 1.
FIG. 3 is an enlarged, diagrammatic view of a cover material for the protective cover.

As will be explained in greater detail, the protective cover 11 is made with a controlled permeability to air for the purpose of effectively preventing any air currents or air movement into the cage to attain a sufficient velocity to transport contaminants into or from the interior of the cage 12. The cover is formed from a web 15 of fibers which are matted together to define tortuous air passageways which serve to lower the velocity of air current to the point where air-borne contaminants cannot be supported. While the prior art has employed fine fibers and very small openings between fibers in an attempt to filter such particles, the protective cover of the present invention may use larger diameter, less expensive fibers, e.g., three or four denier polyester fibers, and larger openings between fibers so long as the transport velocity of any air currents attempting to pass through the protective cover 11 is effectively reduced by the various changes in direction caused by the tortuous passageways.

In addition, as will be pointed out in greater detail, the cover material is fabricated with a particulate barrier media 16 which provides a further decrease in permeability which even further reduces the air current in a controlled manner to provide optimum results. In the preferred embodiments of the invention, the barrier media 16 is provided by minute discrete particles of thermoplastic resin which are disposed on one or both surfaces of the fibrous web of cover material from which the cover is fabricated and which are arranged to limit severely the transport velocity of particles at this interface.

The discrete thermoplastic particles forming the barrier media 16 are applied in a manner to lower the air permeability of the fibrous web or webs forming the cover from the air permeability of the raw material web or for a combination of such webs. In the embodiment shown in FIG. 1, the cover is formed from a pair of fibrous webs 17 and 18 each of which has an initial air permeability, e.g., prior to application of the thermoplastic barrier particles of approximately 120 c.f.m. per ft.$^2$ at ½ inch $H_2O$ pressure differential as measured by a Frazier air permeability tester. The cover web 15 is formed into the desired shape by a hot molding process in which the cover web 15 is stretched while in a heated condition during formation of the protective cover shape. Even after the deformation caused by stretching a flat initial sheet of cover material into the truncated pyramidal shape of the illustrated cover 11 by hot molding, the cover's average permeability to air at a ½ inch $H_2O$ pressure differential is within the range of about 40 to 100 c.f.m. per square foot. Because at ambient room conditions no appreciable pressure differential exists between the inside and outside of the cover (in any event, much less than the ½ inch water pressure differential used in described tests) and also because of the very wide area afforded by the protective cover for the passage of air into and from the animal cage 12, it has been found that the transport velocity of the air carrying virus, bacterial or other very small sized contaminants is reduced to the point that air currents are effectively blocked by the cover with the result that air-borne contaminants attempting to pass through the tortuous passageways of the fibrous webs and then through the barrier layer tend to drop out or become trapped in the cover. On the other hand, the volume of air needed to ventilate the cage is adequately provided by air movement through the large number of passages found in the wide expanse of cover. Thus, the humidity, temperature and carbon dioxide levels in the cage are essentially the same on both the inner and outer sides of the protective cover 11 except during periods of intense animal activity which usually are of limited duration.

Referring now in greater detail to the cover material 15 for the protective cover 11, the base fibrous webs 17 and 18 or if the cover is to be formed from a single web, the single web is made from various kinds of filaments or fibers of synthetic materials. In this connection, rayon, nylon, vinyl derivatives, polyethylene, and the like are contemplated. The fibrous base web may be formed to have acceptable characteristics by processes such as air forming, water forming or mechanical spreading to obtain the desired strength, uniform density and permeability. These processes are generally well known in the prior art.

The preferred base web is formed from a large number of staple length fibers or continuous filaments randomly arranged with the filaments being bonded with one another at a relatively large number of spaced points in a three dimensional arrangement throughout the width, depth and length of the web. The preferred filaments are formed of polyester and are formed into a web by a spunbonded process in which continuous filaments are spun from spinnerettes into a web and are heat sealed to one another at a relatively large number of spaced points throughout the web. As the filaments are randomly oriented and have a large number of bonds between the filaments at their crossing points throughout the depth of the web, it has good strength and resistance to tearing and separating the filaments during the reorientation and stretching of filaments in the molding of the webs into the shape of the protective cover. The filaments may be either crinkled or straight with crinkled filaments being preferred for more deeply drawn covers.

A preferred web is a spunbonded, non-woven web of continuous filaments of polyester of approximately three or four denier (0.7 to 0.8 mil in diameter) of the kind sold under the trademark Reemay by E. I. du Pont de Nemours of Wilmington, Del. These conventional webs are in the form of crinkled filaments and range in weight from about 1.5 oz./yd.$^2$ to 6 ozs./yd.$^2$ with the 6 oz. weight of web being preferred. The polyester filaments are preferred as they are highly resistant to the effects of heat and do not melt at temperatures below about 480° F. as contrasted to much lower temperatures for many other synthetic fibers. These spunbonded webs are quite open and permeable and have air permeabilities of 105 to 135 c.f.m. per ft.$^2$ at ½ inch $H_2O$ pressure differential as measured by a Frazier air tester for 6 oz. material. In contrast to fiberglass mats or other very thick and open filter medium, the preferred web is quite thin, usually 10 to 30 mils in thickness and is relatively dense.

The barrier media 23 is formed of discrete particles of a thermoplastic resin which not only serve as the barrier to high velocity air flow, but also serve to intimately and uniformly bond two webs together if the cover is formed from a two ply construction. The preferred resin particles are small (usually from 20 to 500 microns) and are closely spaced and uniformly distributed on the surfaces of the web or webs to prevent the occurrence of areas which would allow air or air-borne particles to maintain a relatively high transport velocity through the protective cover.

Particularly good results have been obtained with solid particles of polyethylene sold under the trademark "Microthene" by U.S. Chemical Corporation and having a grain size of 297 microns, although satisfactory results have been obtained by using particles having a grain size from about 20 to 500 microns. Another suitable resin is a granular form of nylon sold under the trademark "Zytel"

by Polymer Corporation and Electro Seal Corporation. The amount of resin particles applied has been satisfactorily varied from about 1.0 to 3.5 ozs. per square yard of surface or about 10% to 30% by weight of of the total weight of the base web. By adjusting the amount of resin particles, the permeability of the cover may be decreased to provide the desired barried effect to air currents. As will be explained in greater detail hereinafter in a description of a process for forming the cover material, these solid, resin particles form long fabrils or tendrils under suitable heat and pressure, and these tendrils extend into the respective webs to additionally aid in limiting air velocity and the trapping of contaminants in the protective cover. While solid particles of resin are preferred, the barrier layer 16 may be formed in other manners such as, for example, by discrete viscous liquid particles and droplets of small size disposed substantially on the surface of the base web. As an example, plastic particles may be incorporated into a suitable solvent which, when evaporated, will deposit the plastic in the desired manner.

The cover material may be provided with various surface and strength characteristics by selecting different strengths, weights or kinds of fibers for its base web or webs. For example, a relatively stiff and heavy web may be bonded to a less stiff and a lighter web to provide additional rigidity and strength to make the cover more rigid. On the other hand, a smooth surface web may be laminated to a rougher surface web to provide a smoother surface for preventing large particles of dust or the like from entering into the interior of the fiberous webs of the protective cover. With large particles trapped on the outside of the smooth web, the cover can be more readily cleaned of such dust particles than when these dust particles are trapped within the interior of the respective webs.

In accordance with one preferred method of making a two ply cover material, a first web 17 (FIG. 4) is stripped from a supply roll 19 and is drawn past an applicator 20 which applies a fine layer of particles 21, such as the particulate polyethylene, evenly and uniformly on the top surface of the web 17. The rate of application of the particles 21 and the size of the particles employed is related to the desired permeability and the rate is usually set to a predetermined amount in the range of 1 to 3.5 ozs./yds.$^2$ of granular polyethylene having a grain size between about 20 and 500 microns.

Figure 4:
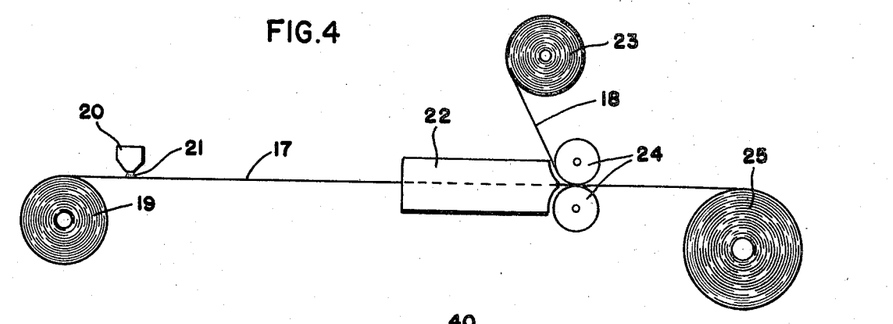
FIG. 4 is a diagrammatic illustration of a manner of making the cover material.

The first web 17 with granules on it passes into a heating station 22 in which the particles 21 are heated by radiant heaters to approximately 290° F.–330° F. for granular polyethylene having a grain size of 297 microns. A second web 18 is stripped from a supply roll 23 and directed downwardly to the nip of a pair of pressure rolls 24 located adjacent the end of the heating station. This second web 18 is at ambient temperature as it moves into engagement with the heated first web 17. The web 17 and 18 are pressed together by the pressure rollers 24 which presses portions of the heated particles, now in the form of tacky globules into the surface interstices of the respective webs. The heating of the particles is controlled so that the globules are softened to flow under pressure but the temperature of globules is maintained slightly below the melting point thereof to prevent the globules from flowing. If the particles were heated to a point where they are too liquid, the particles may flow laterally and join one another and thereby render the cover material impermeable over relatively large areas. As stated above, the plastic-state particles or globules, when subjected to pressure, are thought to produce hair-like fibrils or tendrils which extend into the interstices at the faces of both upper and lower webs 17 and 18 as a result of the heating and pressure applied to the webs.

After the combined webs 17 and 18 leave the nip of the pressure rollers 24, the globules rapidly set up. It takes only seconds for the globules and fibrils to resolidify and anchor the respective webs 17 and 18 to each other.

As the globules and fibrils become solid, they bond the webs together and also are effective to reduce the permeability of the laminated webs to the desired amount. From the pressure rollers 24 the now formed cover material 15 is pulled forward by and wound on a take-up roll 25.

FIG. 3 illustrates schematically the resultant two-ply web. The two fibrous webs 17 and 18 (greatly enlarged) are bonded together at spaced points by the deformed thermoplastic granules 21a (also greatly enlarged). The thermoplastic granules are essentially restricted to the interface of the webs 17 and 18 and are arranged so as to provide a control on the permeability of the cover material without blocking the overall filtering action of the webs as illustrated.

The foregoing process has been employed to laminate various weights of spunbonded polyester webs to webs of similar or different weights. The degree of permeability and strength can be controlled by the selection of the thickness of the individual webs, the number of webs bonded together and the kinds of fibers from which the respective webs are made.

If a single ply cover is to be made, the preferred procedure on the apparatus shown in FIG. 4 is as follows. A single web 17 of material is employed. It is stripped from the supply roll 19 for continuous travel past the particle dispenser 20 which is adjusted to sprinkle a fine layer of the thermoplastic particles evenly and uniformly on the top surface of the web 17. The rate of application of the particles 21 and the size of the particles employed is related to the desired permeability and the rate is set to a predetermined amount in the range of 1.0 to 3.5 ozs./yd.$^2$ of granular polyethylene having a grain size between about 20 and 500 microns.

The web 17 with the particles 21 on it passes into the heating station 22 which heats the particles to approximately 290° F.–330° F. for granular polyethylene having a grain size of 297 microns. The heating of the particles is again controlled so that the globules are softened to flow under pressure but the temperature of globules is maintained slightly below the melting point thereof to prevent the globules from flowing as a liquid. The heated particles are then pressed lightly into the surface of the web 17 by the pressure rolls 24.

After the web 17 leaves the nip of the pressure rolls 24, the plastic particles become solid. As a result, one side of the web 17 is suitably covered with particles and it is wound on roll 25. The web 17 is then inverted so that the opposite, non-particle bearing side of the web is facing upwardly and the process is repeated. The application of particles to the second side of the web is preferably carried on in the same manner as has been described for the first side of the web.

The amount of thermoplastic resin particles added is adjusted to obtain the desired permeability and the desired barrier effect to air currents. When a single 6 oz. web of spunbonded polyester filaments is treated on both sides with thermoplastic resin particles of the foregoing kind, the total weight of resin particles has been successfully varied from 4 oz./yd.$^2$ to 5.4 oz./yd.$^2$ or about 67% to 90% of the weight of the 6 oz. web with about equal distribution of particles on each side of the web. After thermoforming, the air permeability for the cover material 15 averages within the range of about 60–100 cfm/ft.$^2$ at ½ H$_2$O pressure differential.

Figures 6, 7, 9:
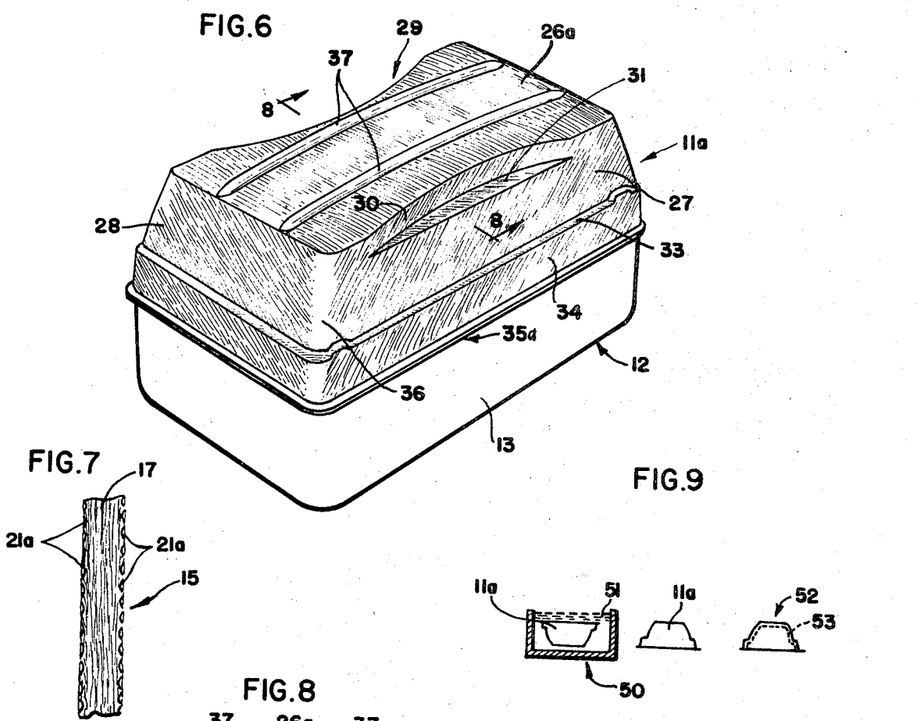
FIG. 6 is a perspective view of an animal cage having a protective cover constructed in accordance with another embodiment of the invention.
FIG. 7 is an enlarged diagrammatic sectional view of a single ply cover material suitable for a protective cover.
FIG. 9 is a diagrammatic illustration of a method of stabilizing the cover.

FIG. 7 illustrates schematically the resultant single-ply web. As illustrated the melted thermoplastic particles 21a decrease the full surface area on both surfaces of the web 17 so that the desired porosity is obtained.

Prior to describing the method of molding a flat sheet of the cover material into the desired shape, the illustrated, truncated pyramidal shaped cover 11 will be described in detail. The protective cover as shown in FIG. 1 is formed with a body having an upper crowned top wall 26 and depending, integrally attached sidewalls 27 and end walls 28 which are inclined downwardly and outwardly from the top wall 26. To facilitate the gripping and handling of the protective cover 11, it is preferred to form suitable hand grips on the top of the cover by means of a pair of opposed indentations 29 in the top portion of the cover. In this instance, the indentations are defined by vertically disposed and inwardly curving walls 30 which extend downwardly and meet, at generally right angles, horizontally disposed shoulder walls 31. The walls 31 extend longitudinally for the length of the curved walls and extend outwardly therefrom to the remainder of the cover sidewall 27. The indentations 29 are spaced apart so that they are easily spanned by a hand gripping the cover between the thumb and fingers.

It is preferred that the cover 11 be provided with means to attach to and engage with a top rim 32 of the cage 12 and also that the cover be readily detachable from the rim 32 to facilitate inspection of the animals in the interior of the cage. To these ends, the lower portion of the cover end walls and sidewalls are formed with outwardly extending, horizontally disposed ledges 33 which are adapted to rest on the top of the cage rim 32. About the lower edge of the cover is a downwardly depending skirt 34 which encircles the exterior of the cage rim 32 and is disposed in close but spaced relationship to the vertical walls of the cage 12. The skirt 34 terminates in a lower, outturned edge 35. The skirt 34 may be provided with a slight taper to wedge against the cage rim 32 and thereby hold the cover against being canted or tipped and prevent direct air flow between the cover ledge 33 and the cage rim 32.

The preferred truncated, pyramidal shape has its end and sidewalls inclined to an extent to facilitate nesting of a number of protective covers 11 within each other and thereby requires but a minimum amount of space during storage or shipment.

Figure 8:
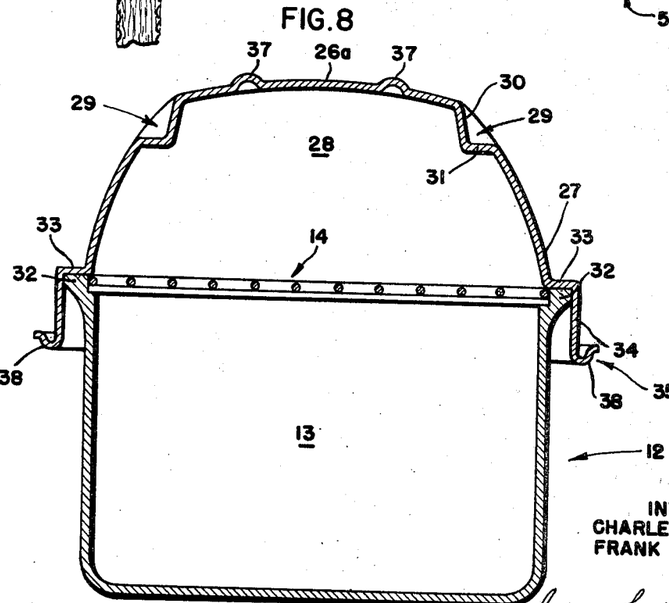
FIG. 8 is an enlarged sectional view taken substantially along the line 8—8 of FIG. 6.

In the event that lighter weight material is to be used, it may be desirable to strengthen the cover. To this end the cover 11a illustrated in FIGS. 6 and 8 is provided with a pair of longitudinally extending transversely spaced apart ribs 27 in the top wall 26a. As shown in FIG. 8 these ribs are integrally molded into the top surface of the cover 11a and serve to strengthen the same without changing the porosity of the cover in the region of the ribs. Similarly, the lower portions of the end and side walls of the cover may be reinforced by providing an outturned edge 35a of sufficient width so that it can be reversely curved to form a rib 38 which extends around the periphery of the cover (FIGS. 6 and 8).

Prior to formation of a flat sheet of the cover material 15 made as outlined above, into the truncated pyramidal shaped cover 11 of FIGS. 1 or 6, it is heated in a suitable oven (not shown) to a temperature sufficient to soften the fibers and/or their bonds so that the fibers can be reoriented into the desired shape. The heated cover material 15 may be molded in a suitable molding apparatus such as the plug molding apparatus shown in FIG. 5. In this instance, the molding apparatus includes a male plug 39 attached to the lower end of a ram 40. The plug is aligned with and disposed above a die 41 which is formed with an appropriate cavity 42 to receive the plug 39.

Figure 5:
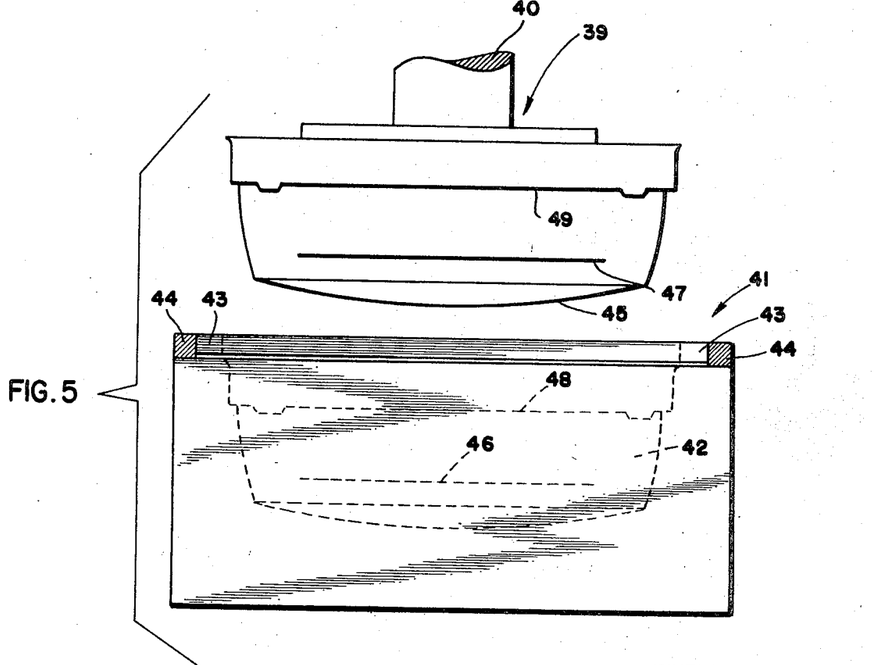
FIG. 5 is a diagrammatic view of an apparatus for molding the cover material into the protective cover illustrated in FIG. 1.

Prior to insertion of the plug 39 into the die 41, the sheet of cover material 15 is attached to a rectangular frame 43 by forcing the marginal edges thereof into tenterhooks (not shown) disposed about the outer edge of the frame 43. The latter is then placed on the top of the die 41 and held against lateral shifting by suitable exterior guide blocks 44. The frame grips the marginal edge of the sheet which is later trimmed at the outturned edge 35 of the finished protective cover 11.

The mold cavity 42 may be shaped generally complementary to the exterior walls of the protective cover 11, and the shape of the plug 39 is generally complementary to the interior walls of the protective cover 11. Thus, a curved surface 45 on the lower end of the plug 39 is curved similar to the top wall 26 of the cover. Shoulders 46 in the mold cavity 42 and adjacent curved vertical walls in the mold cooperate with similar shoulders 47 and curved walls on the plug 39 to form the hand grip indentations 29. A suitable ledge 48 in the mold cavity wall cooperates with a parallel ledge 49 on the plug 39 to form the cover ledge 33 which will engage the rim 32 of the cage.

A specific example of thermoforming a protective cover will be given for the purposes of illustration only. A rectangular sheet of the flat cover material 15 either of single or two-ply construction is secured to the frame 43 and heated in an oven to a temperature in the range of about 350°–375° F. The heated cover material 15 is then transferred to the molding apparatus and positioned in place on the top of the die 41. The ram 40 was brought downwardly to bring the plug 39 against the cover material 15 and the plug 39 is moved downwardly into the die cavity 42 to form the molded shape of the cover 11. At the time of stretching and molding of the cover material 15, the temperature thereof cools to within the range of about 250°–300° F. Preferably, the plug 39 is held in the die cavity 42 for about one minute during which the stretched and reoriented filaments became set to retain the molded shape after which the plug 39 was retracted. After retraction of the plug 39, the formed cover is allowed to cool for sufficient time to become self-sustaining. This usually takes only several minutes. The cover is then removed from the die and is ready for use.

Despite the very considerable stretching of the cover material and the heating thereof, the finished molded protective cover 11 has a limited permeability throughout its various portions. During molding, the filaments reorient and attenuate and the elongation increases the permeability in most portions of the cover 11 from the permeability of the cover material 15 prior to molding. For example, a typical flat sheet of the cover material 15 of the above example has a substantially uniform air permeability across the entire area of the sheet of approximately 8 c.f.m./ft.$^2$ at a ½ inch $H_2O$ pressure differential as measured by a Frazier air test prior to being molded. After molding, the air permeability averages about 57 c.f.m./ft.$^2$ at the cover top wall, 62 c.f.m./ft.$^2$ at the sidewalls and 78 c.f.m./ft.$^2$ at the end walls at the ½ inch $H_2O$ pressure differential. Good results have been obtained with the cover having a range of permeabilities of about 40 to 100 c.f.m./ft.$^2$ at ½ inch $H_2O$ pressure differential. It is preferred to keep the average cover permeability about 60 c.f.m./ft.$^2$ to provide suitable ventilation and to block air currents from sweeping contaminants through the cover. Because of the wide surface area for air flow and the lack of any substantial pressure drop across the cover, the velocity of air through the cover will be extremely low. The combination of tortuous paths through the webs of the protective cover and the barrier media provides a low transport velocity of air which results in protection from air-borne contaminants to a degree heretofore not attainable with prior art filter covers.

While the above cover may be sterilized by a sterilizing gas at low temperatures, under some conditions it may be desirable to stabilize the cover so that it may be sterilized at elevated temperatures. To this end, and as will be explained in greater detail, the fibrous web and the resin particles are coated in a suitable manner with a cured thermosetting resin which stabilizes the protective cover against collapse or substantial shrinkage, when the cover is being sterilized by an autoclaving process such as, for example, by steam at 250° F. at about 20 p.s.i. Because the cover maintains its dimensional stability during autoclaving, the lower rim of the cover will still seal tightly with the upper periphery of the cage. Of particular significance is the fact that thermoset resin is added in a manner through the fibrous mat nor interferes with the controlled air permeability of the cover so that the animals in the cage below the grill receive adequate ventilation and protection from air-borne contaminents.

To stabilize cover 11 for autoclaving, the fibers of the cover material are then coated in a controlled manner with thermosetting resin as outlined in FIG. 9. The cover is first submerged in a tank 50 filled with a bath of thermosetting resin 51 for a predetermined period of time. After submersion, the cover is dried at a drying station and after drying, the thermosetting resin in the cover is cured at an elevated temperature at a curing station 52 whereby the resulting cover becomes relatively stiff, self-supporting, air permeable and resistant to shrinkage during subsequent autoclaving. As will be explained in greater detail, the cover is made oversize and is allowed to shrink onto an open frame 53 during the curing of the resin with the result that the cover is essentially preshrunk and will exhibit only a minor shrinkage, well within tolerance limits, during subsequent autoclaving processes.

The stabilizing operation is carried out as follows. A cover is made as outlined above with deliberately oversized dimensions (e.g., by about ¼ inch oversize in a 14 inch length) to provide the necessary tight seal with the cage rim 32 to allow for shrinkage during the subsequent treatment. The thermosetting resin bath mixture 51 in which the cover is submerged is thin and free flowing so that it will penetrate into the interior of the cover and coat the individual filaments and thermoplastic resin particles without blocking the tortuous passages in the cover material through which the air must flow. Also, the preferred thermoset resin, when cured, does not significantly alter the air permeability for the cover. The coating with and curing of the thermosetting resin reduces the bulk, i.e., the cross sectional thickness of the cover, to a slight degree and this reduction in bulk has resulted in an increase in the permeability in the range of 0–5 c.f.m. per ft.$^2$ at a ½ inch H$_2$O pressure differential. Such an increase of less than 5 c.f.m./ft.$^2$ at ½ in. H$_2$O pressure differential usually will not cause any problems as the various portions of the cover are usually well within the bounds of the preferred permeability range.

The preferred thermosetting resin mixture for stabilizing the cover against shrinkage or collapsing during autoclaving at 250° F. includes a melamine formaldehyde resin and wetting agent mixture to which is added a controlled water content to obtain the desired viscosity. The preferred melamine formaldehyde resin is sold by American Cyanamid under the trademark "Parez 613." This melamine formaldehyde is sold as 80% solid in a liquid solution. The wetting agent aids in wetting and coating the individual filaments particularly within the interior of the cover material; and the preferred wetting agent is sold under the trademark Triton X–100 by Rohm and Haas Corporation. The preferred proportions for the thermosetting resin mixture 100 by percentage of the total volume (except for the wetting agent) are as follows:

| | Percent |
|---|---|
| Parez 613 | 50–80 |
| Water | 50–20 |
| Triton X–100 (wetting agent) (by weight) | 1 |

The percentage of water added may be varied depending upon the manner of curing and also upon whether or not the cover being submerged into the solution is made from a single ply cover material or a two ply cover material. A suitable viscosity for the above resin mixture made with 50% water and 50% Parez 613 is 75 centipoises as measured by a Brookfield LVT viscometer using a #3 spindle at 12 r.p.m. and at ambient room conditions.

In addition to controlling the viscosity of the resin mixture, it is found that best results are obtained by carefully controlling the time period of submersion (i.e., dipping) in the thermosetting resin mixture. It has been found that considerable increases in time of submersion result in greater accretion of thermosetting resin which may interfere with the permeability characteristic of the cover. As will be seen from the following examples, the preferred time for the dipping of a single ply cover material is about 10 seconds while a two ply cover material has been dipped as long as 15 seconds with satisfactory results.

Another thermosetting resin which may be used in lieu of the melamine formaldehyde is a urea formaldehyde resin such as Synvar WR 513 sold by Synvar Southern Chemical Corporation. For example, a thermosetting mixture using urea formaldehyde may be as follows:

| | Percent |
|---|---|
| Synvar WR 513 (by volume) | 50 |
| Water (by volume) | 50 |
| Synvar 192 (catalyst) (by weight) | 0.2 |

On the other hand, an epoxy resin such as, for example, Eponite 100 sold by Shell Chemical Company may also be used.

After submersion in the thermosetting resin mixture, the covers are removed and allowed to air dry for a period of 16 to 18 hours at ordinary room temperatures. The period of air drying has been successfully reduced in some instances to 5 to 6 hours by the addition of a suitable catalyst to the thermosetting resin solution. A suitable catalyst for the melamine formaldehyde mixture is 0.1% aluminum chloride by weight of the total weight of the mixture. Alternatively, the air drying time can be reduced to two hours if the covers are dried by hot air at a temperature of 150° F.

After the air drying, the covers are placed in a curing chamber such as an oven for the final cure of the thermosetting resin coating on the fibers and thermoplastic particles in the cover. Care is taken during the final curing operation to limit and control the final cover shape and the amount of shrinkage of the cover. Prior to receiving the final cure in the oven, the air cured cover which is oversized, is placed on a smaller relatively open, rigid wire form or mold 53 (FIG. 9) which permits complete air circulation about the cover during curing of the thermosetting resin. The wire mold is preferably made of stainless steel bars which will withstand corrosion and chemical action when exposed to high temperatures, moisture and resins. The bars are placed at locations at which the cover dimensions must be sized e.g., the width and length dimensions along the cover rim which seals with the cage rim. Also, the height of the cover is controlled by bars so that the cover will fit over feeding bottles (not shown) which may be inserted in the cage to feed the mice. During the final cure of the thermosetting resin, the cover material shrinks from its oversized state to the precise dimensions provided by the wire mold. The once flexible cover becomes relatively rigid and any wrinkles in the cover are removed as a result of shrinkage during the final cure so that the finished cover material is smooth and unwrinkled in appearance.

The preferred curing temperature for the described thermosetting resin mixtures of melamine formaldehyde applied to a single ply 6 oz. cover material is within the range of 350°–360° F. for a period of about 45 minutes. The preferred cure for the same mixture applied to the two ply, 6 oz. cover is at a slightly higher temperature of about 375° F. for a period of about 45 minutes.

The percentage weight increase due to accretion of the cured preferred melamine formaldehyde thermosetting resin for the two ply 6 oz. cover material preferably is in the range from about 57% to 80% of the original weight of the thermoformed cover prior to dipping in the thermosetting resin. For the single ply, 6 oz. cover material 15 thermoformed into a cover, the accretion of the melamine formaldehyde resin is preferably in the range of 90% to 115% of the original weight of the cover prior to dipping into the thermosetting resin.

The cured cover is self-sustaining and has the desired permeability characteristics for proper ventilation of the animal cages while effectively blocking ingress or egress of air-borne diseases and contaminants to the cage. Preferably, the permeability of the various portions of the cover are all within the range of about 60–100 c.f.m. per ft.$^2$ at a ½ inch H$_2$O pressure differential, the air permeabilities varying at different portions of the cover due to the amount of stretching received during thermoforming. It has been observed that some conventional foods for mice deteriorate due to a build up in a relative humidity in the cage if the air permeability is less than 60 c.f.m./ft.$^2$ at ½ in. H$_2$O pressure differential. When the food used is not so susceptible to deterioration with humidity, air permeabilities of less than 60 c.f.m. per ft.$^2$ at a ½ in. H$_2$O pressure differential may be used. The permeability of the cover to air is preferably less than 100 c.f.m. per ft.$^2$ at a ½ in. pressure differential, although air permeabilities in excess of this may be used in environments in which the cover is not subjected to unusual air currents or drafts. It will be appreciated that the ranges of permeabilities set forth herein allow a most adequate ventilation of conventional and standard sizes of animal cages for housing mice. However, if the cover ventilation requirements are changed, the air permeability of the cover may be suitable adjusted by varying the application rate of thermoplastic resin particles for the cover material so long as the permeability is kept sufficiently low to block travel of air-borne contaminants through the cover.

The following examples are given for illustrative purposes with the understanding that the present invention is not to be limited to these examples.

EXAMPLE I

Two webs 17 of 6 oz. per square yd. spunbonded REEMAY polyester filaments of 3 denier are laminated together with about 2 oz. per yd.$^2$ of Microthene particles having a nominal size of 297 microns. The webs were laminated together by the process outlined above, namely (a) the particles of the thermoplastic polyethylene resin were uniformly distributed over the surface of one of the webs, (b) the web and polyethylene particles were heated to a point where the particles softened (c) the second web was brought in contact with the particle-bearing side of the first web and (d) the webs were permitted to cool. The finished cover material had an air permeability of 8–10 c.f.m. per ft.$^2$ at ½ inch water pressure differential as measured by the Frazier air tester.

The edges of a 14 inch by 19 inch rectangular sheet of the resultant cover material was secured in a frame and heated in an oven to a temperature of about 360° F. The heated cover was then rapidly transferred to a molding apparatus as described above and formed into an animal cage cover shaped substantially as illustrated in FIGS. 1 and 2 having dimensions of 9 inches by 16 inches by 4¾ inches deep. After the cover had cooled, it was removed from the mold and was ready for use. The air permeability of the cover varied from point to point depending upon the severity of the draw, however, it was well within the range of 60–100 c.f.m. per ft.$^2$ at ½ inch water pressure differential as measured by a Frazier air tester.

EXAMPLE II

Two webs 17 of 6 oz. per square yard spunbonded polyester filaments of three denier are formed into the cover material with about 2 ozs. per yd.$^2$ of Microthene particles of a thermoplastic polyethylene resin distributed at the interface betwen the webs. This cover material was made and thermoformed in the manner above described in Example I and was shaped substantially as illustrated in FIGS. 1 and 2 except that it was molded to dimensions of 9³⁄₁₆ inches by 16⁵⁄₁₆ inches by 4¹³⁄₁₆ inches deep. The thermoformed cover was then dipped into a thermosetting resin mixture for a period of 10 seconds and then removed and air dried for 17 hours. The proportions for the thermosetting resin mixture were 30% by volume (of the total) of Parez 613 melamine formaldehyde resin and 70% by volume (of the total) of water with 1% by weight of Triton X–100 wetting agent.

After 17 hours of air drying at ambient room conditions, the cover was disposed on a wire mold sized to 9 inches by 16 inches by 4¾ inches deep and inserted into an oven for 45 minutes at 375° F. The cover was removed and then weighed to determine the accretion of cured thermosetting resin. The accretion of thermosetting resin was 70% of the weight of the raw cover prior to dipping into the resin mixture 100. The air permeability for the cover varied at several portions of the cover, but was well within the range of 60–100 c.f.m. per ft.$^2$ at ½ inch H$_2$O pressure differential as measured by a Frazier air tester. The cover was then subjected to an autoclaving cycle of 250° F. steam at 20 p.s.i. for a period of 15 minutes. The cover was also washed in a conventional industrial washer with hot water and a detergent to simulate an actual washing which the cover may receive when dirt and dust particles accumulate on the outer surface of the cover. The cover withstood both the autoclaving and washing and, in fact, withstood several of these washing and autoclaving cycles.

EXAMPLE III

A 6 oz. web of spunbonded polyester filaments of three denier was provided with 2 ozs. per yd.$^2$ per side of Microthene thermoplastic particles which were then softened and pressed into the surfaces as outlined above. The cover material was thermoformed into the shape of a raw cover in a thermoforming station in accordance with the manner above described in Example I and was sized as in Example II.

To stabilize the thermoformed cover for autoclaving and washing, the cover was dipped into a thermosetting resin mixture 51 for a period of 10 seconds. The proportions of the thermosetting mixture 51 were 50% by volume (of the total) of the water and 50% Parez 613, melamine formaldehyde, by volume (of the total) and 1% by weight of Triton X–100 wetting agent. As the resin mixture did not contain any catalyst, the cover was air dried for 17 hours at ambient room conditions. After air drying, the cover was placed on a wire mold, sized as in Example II, and inserted into an oven and cured at 350° F. for 45 minutes. The cover was weighed before being dipped into the thermosetting mixture and was weighed after the melamine formaldehyde resin had been cured. The resin accretion was found to be 105% of the original weight of the cover prior to dipping into the resin mixture.

The cover was washed in an industrial washer for a number of cycles and was autoclaved at 250° F. with steam at 20 p.s.i. for several cycles. The amount of dimensional shrinkage due to the autoclaving was found to be approximately 1% which was well within the tolerance limits needed for sealing with the animal cage. The limiting of the subsequent shrinkage of the cover is achieved by the size of the wire mold and holding the temperature of cure higher than the temperatures to be experienced during autoclaving or washing.

The air permeabilities tested over various portions of the cover were found to be within the desired range of 60–100 c.f.m. per square foot at a ½ inch H$_2$O pressure differential as measured by a Frazier air test.

From the foregoing, it will be seen that protective covers having thermoplastic resins therein may be stabilized to undergo washing or autoclaving at elevated temperatures by a thermosetting resin which is applied in such a manner that it does not interfere with the controlled permeability of the cover. Preferably, the thermosetting resin is cured at a temperature higher than the temperatures to be encountered during washing and the cover is preshrunk during curing. The manner of applying the thermosetting resin neither plugs the tortuous air passageways in the cover nor affects adversely the controlled air permeability of the cover. Finally, the cover has been clinically tested with good results.

Illustrative of the unique protective characteristics for the protective cover are the results obtained when housing so called sterile or "germ free" mice under similar sets of conditions in cages having a conventional filter cover and the protective cover of this invention. These germ free mice are the result of housing and breeding many generations of mice within extremely sterile surroundings so that the mice do not have the usual resistance to infectious diseases and viruses. In one set of tests, baby, germ free mice were surgically removed from their mother's womb and placed in sterile cages covered by filter covers of the prior art; the baby mice have survived for only about 24 hours. In contrast, similar baby, germ free mice have been housed in similar cages with the protective cover and have survived for approximately 30 days. Of course, the germ free mice and the cages were removed to a sterile room for feeding and cleaning the cages, at which time the protective covers were opened, but otherwise the protective covers were the only protection the mice had against being contaminated by airborne bacteria or viruses.

Thus, it will be seen that the present invention provides a new and improved cover which has an air barrier layer for assuring that the velocity of air passing through the cover is at a very low velocity and which has fibers providing tortuous passageways to cause the air to deflect and change directions whereby the air-borne viruses or particles drop out within the fibrous webs of the cover. The protective cover is capable of being manufactured by molding processes and may be made at sufficiently low cost so as to compete and replace the covers of the prior art.

While a preferred embodiment has been shown and described, it will be understood that there is no intent to limit the invention by such disclosure but, rather, it is intened to cover all modifications and alternate constructions falling within the spirit and scope of the invention as defined in the appended claims.

What is claimed is:

1. A protective animal cage cover comprising a body of fibrous sheet material having tortuous passageways therein for passage of air through said body and into said cage, particles of thermoplastic resin in said fibrous sheet material to provide a controlled air permeability for said sheet material and to thereby limit the transportation of air-borne particles through said tortuous passageways, and a cured coating of thermosetting resin on the fibers of said fibrous sheet material and on said particles constituting a means to stabilize the body relative to sterilization temperatures occurring at autoclaving.

2. A protective cover in accordance with claim 1 in which said fibrous sheet material is a single ply web of matted, long, randomly oriented filaments disposed in three dimensional arrangement having intercommunicating voids between filaments thereby providing said tortuous passageways for passage of air and in which said sheet weight about 1.2 to 6 ounces per square yard prior to receiving said thermoplastic particles and said cured coating of thermosetting resin.

3. An animal cage cover in accordance with claim 2 in which said fibrous sheet material is coated on both sides with said thermoplastic particles, the total weight of said particles being within the range of about 4.0 ounces to 5.4 ounces per yd.$^2$.

4. A animal cage cover in accordance with claim 3 in which said filaments are made of a thermoplastic resin and in which the accretion of cured thermoset resin is about 57% to 115% of the cover weight without said thermoset resin.

5. An animal cage cover in accordance with claim 4 in which said thermosettnig resin is melamine formaldehyde resin deposited on said fibers and on said particles from a water solution having a viscosity of about 75 centipoises.

6. A protective cover in accordance with claim 1 in which said fibrous sheet material is formed of two webs of thermoplastic resin filaments joined at the interface thereof with said thermoplastic resin particles and in which the accretion of thermoset resin is about 60%–80% of the cover weight without said thermoset resin.

References Cited

UNITED STATES PATENTS

| | | | |
|---|---|---|---|
| 3,304,913 | 2/1967 | Nesher | 119—15 |
| 3,309,849 | 3/1967 | Ward | 55—387 |
| 3,315,447 | 4/1967 | Meier | 55—384 |
| 3,343,520 | 9/1967 | Schwarz | 119—15 |
| 3,396,701 | 8/1968 | Trexler | 119—15 |

ALDRICH F. MEDBERY, Primary Examiner

U.S. Cl. X.R.

55—387, 528, 529; 119—15; 128—1

UNITED STATES PATENT OFFICE
CERTIFICATE OF CORRECTION

Patent No. 3,528,227          Dated September 15, 1970

Inventor(s)    Charles A. Lee and Frank D. Sorrells

It is certified that error appears in the above-identified patent and that said Letters Patent are hereby corrected as shown below:

Column 1, line 24, before "molded" insert --a--;
           line 49, "ino" should read --into--;
           line 71, change "haivng" to --having--.
Column 2, line 25, "he" should read --the--.
Column 5, line 4, delete "of", first occurrence;
           line 10, "fabrils" should read --fibrils--.
Column 8, line 73, after "manner" insert --which neither plugs the small tortuous passageways--.
Column 9, line 3, after "stabilize" insert --the--;
           line 18, "toltrance" should read --tolerance--.
Column 11, line 22, "suitable" should read --suitably--;
           line 64, "betwen" should read --between--.
Column 14, line 23, "thermosettnig" should read --thermosetting--.

SIGNED AND SEALED
DEC 8 - 1970

(SEAL)
Attest:

Edward M. Fletcher, Jr.
Attesting Officer

WILLIAM E. SCHUYLER, JR.
Commissioner of Patents